United States Patent
Perrino

[11] 3,827,317
[45] Aug. 6, 1974

[54] WIRE STRIPPER
[76] Inventor: Joseph Perrino, Ash St., Rehoboth, Mass. 02769
[22] Filed: Dec. 18, 1972
[21] Appl. No.: 316,382

[52] U.S. Cl. .................................. 81/9.5 B, 7/5.4
[51] Int. Cl. ............................................ H02g 1/12
[58] Field of Search.......... 81/9.5 R, 9.5 B; 30/90.1; 7/14.1 R, 5.4

[56] References Cited
UNITED STATES PATENTS
1,566,297 12/1925 Williams ........................ 30/90.1 X
1,857,731 5/1932 Lund .............................. 30/90.1 X
1,977,677 10/1934 Hill ................................ 30/90.1 X
FOREIGN PATENTS OR APPLICATIONS
1,046,133 12/1958 Germany ......................... 81/9.5 B Primary Examiner—Al Lawrence Smith
Assistant Examiner—Roscoe V. Parker
Attorney, Agent, or Firm—Salter & Michaelson

[57] ABSTRACT

A device for stripping insulation from the end of a wire having elongated pivotal grip members between which a tubular member extends. The wire projects through the tubular member for engagement with a stop gauge and opposed cutting elements envelop the tubular member and are movable by the grip members in a cutting operation to penetrate the insulation of the wire, whereafter the end portion of the insulation as located between the stop gauge, and the penetrated section is stripped from the wire. The cutting elements and tubular element are replaceable in accordance with the requirements of use.

10 Claims, 6 Drawing Figures

WIRE STRIPPER

BACKGROUND OF THE INVENTION

The present invention relates to wire strippers and has particular application as a portable hand-held device for use in stripping insulation from small diameter wire.

Wire stripping devices for use in the stripping of insulation from electrical wire are well known in the art, and over a period of time have taken various shapes and forms in the construction thereof. In the stripping of insulation from small diameter wire, the wire strippers known heretofore have not been altogether satisfactory because the cutting elements of these prior known stripping devices quite frequently cut through the insulation into the wire strands, thereby nicking the wire strands and reducing the conductivity characteristics thereof. In most of the prior known stripping devices, the depth of cut of the cutting elements was not precisely controlled; and as a result, the user of the device had to gauge how deeply to cut into the insulation. However, such approximation was not always accurate and nicking or cutting of the wire strands oftentimes resulted.

In the stripping of insulation of small diameter wire, it is also desirable to strip a precise length of insulation from the end of the wire. The prior known devices did not usually provide any means for measuring the amount of insulation to be stripped; and consequently, portions were sometimes stripped from the wire that were inconsistent with the requirements of use. Although some attempts have been made heretofore to provide special wire strippers for stripping insulation from any diameter wire, these prior known devices have been relatively complicated and usually did not include cutting elements that could be replaced as desired; and as a result, such prior devices were prohibitive in the cost and maintenance thereof.

SUMMARY OF THE INVENTION

The present invention relates to a device for stripping insulation from an end portion of a wire and includes a pair of hand-held grip members that are pivotally interconnected at one end thereof. A tubular member extends through the means for interconnecting the grip members and defines a guide for receiving the lead-in portion of a wire from which insulation is to be stripped. Replaceable cutting elements are secured to the grip members for movement therewith to a closed position, the cutting elements being movable by the pivotal movement of the grip members to the closed position to penetrate into the insulation of the wire, whereafter a longitudinal retracting movement of the wire will strip the insulation from the lead-in portion thereof.

The cutting elements are preferably formed in a semi-cylindrical configuration so as to interfit around the tubular member and have a blade edge formed on an end thereof, wherein the blade edges on the cutting elements are disposed in opposed relation with respect to the wire received in the tubular member. Thus, upon a pivotal movement of the grip members to the closed position thereof, the cutting elements are movable therewith to envelop the tubular member and to engage the wire for penetrating the insulation thereof. The cutting elements and tubular member are easily removed from their assembled position for replacement by similar units in accordance with the size of the wire to be stripped.

Accordingly, it is an object of the present invention to provide a hand-held wire stripping device that includes replaceable cutting elements for penetrating the insulation of a wire a predetermined distance so that a measured portion of the insulation can be effectively stripped from the wire.

Another object of the invention is to provide a wire stripper for use in stripping insulation from a small diameter wire and that includes pivotally interconnected grip members between which a tubular wire guide is located, the wire guide receiving the wire therein for directing it to a location whereby cutting elements surrounding the tubular member are movable by the grip members in a penetrating cutting action into the wire insulation.

Still another object of the invention is to provide a hand-held wire stripper that includes a measuring gauge that enables a predetermined length of insulation to be stripped from the lead-in-portion of a wire.

Still another object is to provide a hand-held wire stripper that includes resilient means for normally biasing apart pivotally interconnected grip members, a stop being further provided for positively restricting closing movement of cutting elements of the device during a cutting action thereof so as to prevent undue penetration of the cutting elements into the wire insulation.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
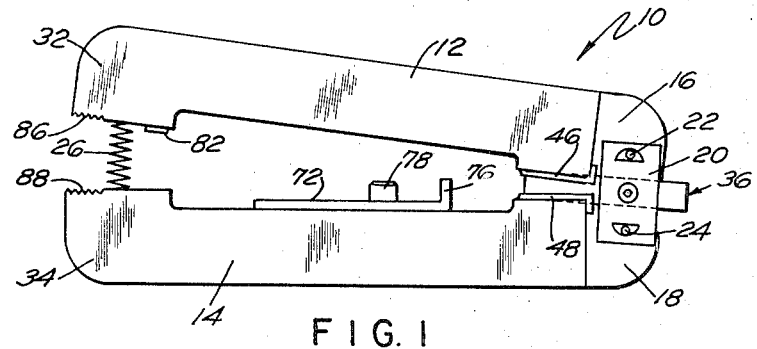
FIG. 1 is a side elevational view of the wire stripper as embodied in the present invention showing the gripping members in the open position thereof.
Figure 2:
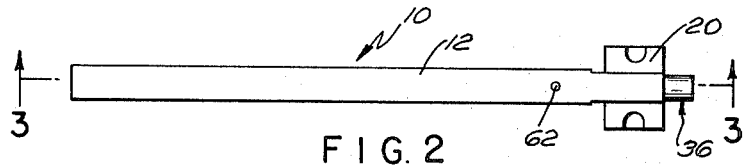
FIG. 2 is a top plan view thereof.

Referring now to the drawing, the wire stripper embodied in the present invention is generally indicated at 10, and as illustrated is of the hand-held type that is designed to strip insulation preferably from small diameter wire. However, as will be described, various diameter wire may be stripped by the device. The wire stripper 10 includes substantially identically formed grip members 12 and 14 that are elongated in shape and configuration and are generally parallel in the position of use. Interconnecting heel portions 16 and 18 of the gripping members 12 and 14, respectively, is a two-part pivot block 20. The heel portions 16 and 18 of the gripping members are pinned to the pivot block 20 by pins 22 and 24, respectively, the pivot connection providing for limited pivotal movement of the gripping members 12 and 14. In this connection the extreme outer pivotal movement of the gripping members 12 and 14 is illustrated in FIGS. 1 and 3, it being understood that the gripping members 12 and 14 are urged inwardly to a closed position as illustrated in FIG. 4 during a cutting and stripping operation of a wire.

Figure 3:
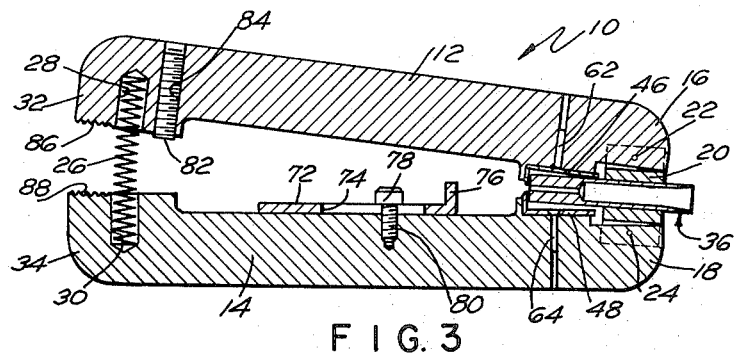
FIG. 3 is a sectional view taken along line 3—3 in FIG. 2.
Figure 4:
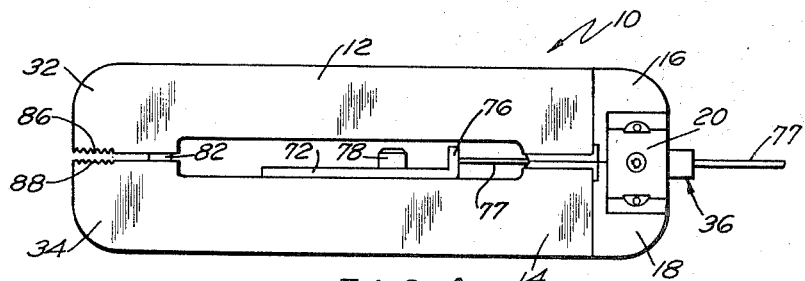
FIG. 4 is a view similar to FIG. 1 and showing the gripping members of the device in the closed position thereof during a cutting operation of the wire insulation.

In order to urge the gripping members 12 and 14 to the outer pivoted position as illustrated in FIGS. 1 and 3, a spring 26 is provided and extends into openings 28 and 30 formed in head portions 32 and 34, respectively, of the gripping members 12 and 14. It is seen that the spring 26 normally urges the gripping members 12 and 14 to the outer pivoted position thereof but may be compressed to provide for the inward pivotal movement of the gripping members as required.

Figure 5:
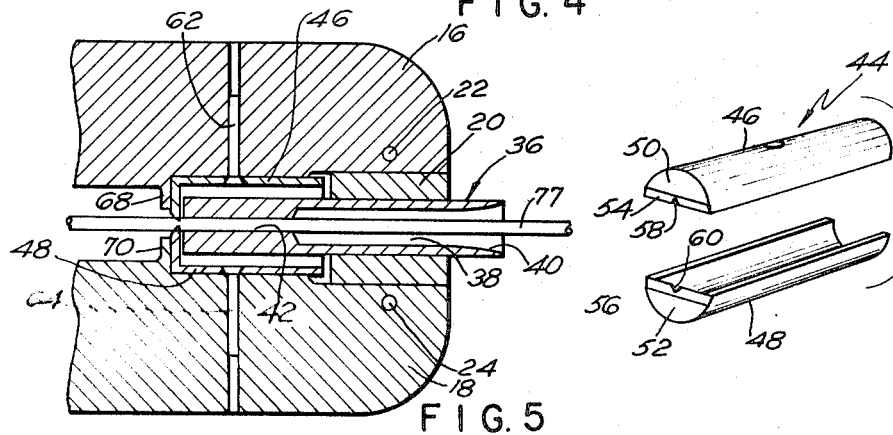
FIG. 5 is an enlarged fragmentary sectional view of an end portion of the wire stripper showing the position of the cutting elements during a wire penetrating operation.

In order to provide a guide for a wire to be stripped, a tubular member generally indicated at 36 is provided and extends through an opening in the pivot block 20 and between the heel portions 16 and 18 of the gripping members 12 and 14. The tubular member 36 is frictionally retained in position within the pivot block 20; and as illustrated in FIG. 5, is formed with an enlarged entry passage 38 with which a tapered entry opening 40 communicates. Communicating with the entry passage 38 is a reduced passage 42, the reduced passage 42 extending through the inner end of the tubular member 36. The reduced passage 42 is dimensioned for accommodating the wire to be stripped, and as will be described, the tubular member 36 may be replaced by a similar member in accordance with the diameter of the wire to be stripped.

Figure 6:
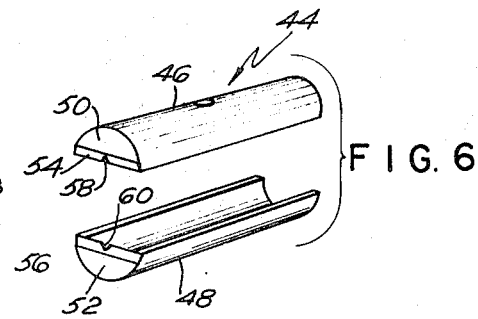
FIG. 6 is an exploded perspective view of the cutting elements as used in the wire stripper device.

In order to penetrate the insulation of the wire that is inserted through the tubular member 36, a cutting element assembly generally indicated at 44 is provided and includes opposed cutting elements 46 and 48. As illustrated in FIG. 6, the cutting elements 46 and 48 are substantially identical and are formed in a semicylindrical configuration, the outer ends being open, but the inner ends being formed with end walls 50 and 52, respectively, on which blade edges 54 and 56 are formed. Blade 54 is provided with a notch 58, whereas blade 56 is provided with a notch 60, the notches 58 and 60 being located in opposed relation and normally preventing penetration of the blade edges into the wire strands of the wire during a severing operation of the wire insulation. The gripping members 12 and 14 accommodate the cutting elements 46 and 48 by being formed with corresponding arcuate recesses therein, the cutting element 46 being secured to the heel portion 16 of the gripping member 12 by a pin 62 that extends therethrough, while the cutting element 48 is secured to the heel portion 18 of the gripping member 14 by a pin 64. As shown in FIG. 5, the walls or front edges 50 and 52 of the blade elements 46 and 48 abut against flanges 68 and 70, respectively, that are formed on the gripping members 12 and 14, and the cutting elements are thus positively located in the arcuate recesses as formed in the gripping members. The semi-cylindrical configuration of the cutting elements is such that these elements interfit in enveloping relation around the tubular member 36, and the cutting elements are thereby able to move to a closed position around the tubular member 36 during a cutting and penetrating operation.

Oftentimes it is desirable to exactly remove an end portion of the insulation from a wire, and for this purpose a gauge 72 is provided and includes an elongated body having a slot 74 formed therein to which an upstanding end portion 76 is joined. The upstanding end portion 76 is spaced from the cutting assembly 44 and is located in alignment with the tubular member 36 for receiving the lead-in end of a wire indicated at 77 for engagement therewith. A fastener 78 projects through the slot 74 and is threadably received in a threaded opening 80 formed in the gripping member 14. It is seen that the gauge 72 may be adjusted in position on the gripping member 14 to locate the upstanding end portion 76 a required distance from the blade edges 54 and 56 so as to exactly determine the length of insulation to be stripped from the wire 77. Adjustment of the position of the upstanding end portion 76 is accomplished by loosening the fastener 78 and moving the gauge 72 as required.

In order to prevent the blade edges 54 and 56 from penetrating too deeply into the insulation of the wire 77, a threaded stop 82 is provided and extends through a threaded opening 84 formed in the head portion 32 of the gripping member 12. The stop 82 is rotated within the threaded opening 84 to move it in or out of the opening so as to project outwardly therefrom for engagement with the opposite surface formed on the head portion 34 of the gripping end member 14 as the gripping members are moved to the closed position thereof. It is seen that when the stop 82 engages the opposite surface of the gripping member 14, it will prevent the gripping members from further closing, and thereby will prevent further penetration of the blade edges 54 and 56 into the insulation of the wire 77.

Sometimes it is desirable to remove the wire 77 after the penetration of the insulation thereof by the blade edges 54 and 56 and before stripping of the insulation therefrom. The insulation can then be easily stripped from the wire 77 by placing the lead-in end of the wire between jaws 86 and 88 as formed on the opposed surfaces of the head portions 32 and 34 of the gripping members. As illustrated in FIGS. 3 and 4, the jaws 86 and 88 are roughened or knurled and firmly grip the insulation when urged into engagement therewith. Pivotal movement of the gripping members 12 and 14 to the closed position thereof will cause the jaws 86 and 88 to firmly engage the insulation, and an outward pull on the wire will easily detach the portion of the insulation to be stripped from the wire after the penetrating or cutting action has been accomplished.

If it is desirable to strip a wire of different diameter, the tubular member 36 and the cutting assembly may be removed from the gripping members and replaced with similar elements of the appropriate size. This is accomplished by removing the pins 62 and 64 and the pivot block 20.

In the use of the device, the wire 77 is threaded through the tubular member 36, the tapered opening 44 providing for easy entry of the lead-in end of the wire 66, the wire projecting through the enlarged entry passage 38 into the reduced passage 42 and then outwardly thereof for contact with the upstanding end portion 76 of the gauge 72. The gripping members 12 and 14 are then pivotally moved to a closed position which carries the cutting elements 46 and 48 therewith, thereby bringing the blade edges 54 and 56 into contact with the insulation of the wire 77 in a cutting or penetrating action. If desired, the gripping members may remain in the closed position, whereafter the wire 77 is pulled outwardly to strip the end portion of the insulation from the wire. In this connection, the tapered entry 40 enables the wire 66 to be pulled thereagainst at an angle without cutting the wire insulation at that point, this movement further providing additional leverage for extracting the wire in a stripping action. If desired, the wire may be removed from the tubular member prior to the stripping movement be release of the gripping members 12 and 14 from the closed position; and thereafter, the end portion of the wire that has been penetrated can be placed between the jaws 86 and 88, the gripping members closed thereon and the wire pulled outwardly to strip the insulation from the end portion.

While there is shown and described herein certain specific structure embodying the invention, it will be manifest to those skilled in the art that various modifications and rearrangements of the parts may be made without departing from the spirit and scope of the underlying invention concept and that the same is not limited to the particular forms herein shown and described except insofar as indicated by the scope of the appended claims.

What is claimed is:

1. A device for stripping insulation from an end portion of a wire comprising a pair of hand-held, elongated, parallel grip members, means interconnecting said grip members at one end thereof, wherein said grip members are free at the other ends thereof and are pivotally movable with respect to each other to a closed position, a tubular member extending through said interconnecting means intermediate said grip members and defining a guide for receiving therein the lead-in portion of a wire from which insulation is to be stripped, cutting elements secured to said grip members for movement therewith to the closed position, said cutting elements being movable by the pivotal movement of said grip members to the closed position to penetrate into the insulation of said wire, whereafter a longitudinal retracting movement of said wire will strip the insulation from the lead-in portion thereof.

2. A device as set forth in claim 1, each of said cutting elements having a blade edge formed on an end thereof, wherein said blade edges are located in opposed relation with respect to the wire received in said tubular member.

3. A device as set forth in claim 2, said cutting elements being substantially semi-cylindrical in configuration for interfitting around said tubular member.

4. A device as set forth in claim 3, spring means engaging the other ends of said grip members and normally urging them apart, wherein the pivotal movement of said grip members compresses said spring means so that the grip members are urged apart after a stripping operation and upon release of said grip members.

5. A device as set forth in claim 3, the outermost end of said tubular member having a funnel-like configuration that provides a guide for entry of the lead-in end of said wire therein and that further enables said wire to be pulled outwardly of said tubular member after stripping at any angle without scoring or nicking the insulation on said wire.

6. A device as set forth in claim 3, an adjustable gauge element secured to one of said grip members on the inside edge thereof, said gauge element having an upstanding portion that is spaced from said cutting elements in alignment with said tubular member and defining an abutment against which the lead-in end of said wire engages after projection through said tubular member, the space between said upstanding portion and cutting elements defining the portion of the insulation to be stripped from said wire.

7. A device as set forth in claim 6, said gauge element having an elongated portion secured to said upstanding portion, an elongated slot formed in said elongated portion, a fastener extending through said slot and into said one grip member for adjustably securing said gauge element thereto.

8. A device as set forth in claim 1, a stop element adjustably secured in one of said grip members and projecting outwardly therefrom a predetermined distance for engagement with the other grip member upon movement of the grip members to the closed position in the cutting action of the wire insulation, wherein said stop element inhibits further inward movement of the grip members.

9. A device as set forth in claim 1, a roughened gripping area formed on a portion of the free end of each of said grip members, said gripping areas being located on the free ends of said grip members that are opposite to the location of said tubular member and being disposed in opposed relation to each other, said gripping areas being movable into close proximity to each other upon pivotal movement of said grip members for engaging a wire therebetween, wherein insulation on said wire that has been penetrated by said cutting elements is strippable therefrom.

10. A device as set forth in claim 1, an adjustable gauge element secured to one of said grip members and having a stop portion that is spaced from said cutting elements in alignment with said tubular member to define an abutment against which the lead-in end of said wire engages after projection through said tubular member, the space between said stop portion and cutting elements defining the portion of the insulation to be stripped from said wire.

* * * * *